United States Patent
Chang

(10) Patent No.: US 7,844,124 B2
(45) Date of Patent: Nov. 30, 2010

(54) METHOD OF ESTIMATING A QUANTIZATION PARAMETER

(75) Inventor: Fang-Chen Chang, Tainan County (TW)

(73) Assignee: Himax Technologies Limited, Sinshih Township, Tainan County (TW)

(*) Notice: Subject to any disclaimer, the term of this patent is extended or adjusted under 35 U.S.C. 154(b) by 872 days.

(21) Appl. No.: 11/747,259

(22) Filed: May 11, 2007

(65) Prior Publication Data
US 2007/0297686 A1 Dec. 27, 2007

(51) Int. Cl.
*G06K 9/00* (2006.01)
*H04N 7/12* (2006.01)
(52) U.S. Cl. .................. 382/251; 375/240.04
(58) Field of Classification Search ............ 382/251; 375/240.01
See application file for complete search history.

(56) References Cited

U.S. PATENT DOCUMENTS

| 5,440,344 A | 8/1995 | Asamura et al. |
| 5,781,237 A | 7/1998 | Fukuda |
| 5,818,529 A * | 10/1998 | Asamura et al. ....... 375/240.23 |
| 5,999,657 A * | 12/1999 | Yasuhiko .................. 382/248 |
| 6,415,057 B1 | 7/2002 | Suzuki et al. |

* cited by examiner

*Primary Examiner*—Bhavesh M Mehta
*Assistant Examiner*—Hadi Akhavannik
(74) *Attorney, Agent, or Firm*—Thomas, Kayden, Horstemeyer & Risley

(57) ABSTRACT

A method of estimating a quantization parameter is provided. The method is applied to a de-blocking filter. The de-blocking filter de-blocks a decoded block-based image according to the quantization parameter, and the block-based image is coded and decoded in units of macroblocks. The method comprises calculating blocking degrees of a number of block edges corresponding to the macroblocks; and estimating the quantization parameter according to a sum of the blocking degrees.

21 Claims, 5 Drawing Sheets

QP=39

QP=33

QP=30

QP=26

```
┌─────────────────────────────────────────────────┐
│ Determine whether a sum of luminance absolute   │
│ differences of a few pairs of inter pixels      │
│ next to the block edge is larger than a first   │──211'
│ preset value, and if no set the blocking        │
│ degree of the corresponding block edge is 0     │
└─────────────────────────────────────────────────┘
                        │
                        ▼
┌─────────────────────────────────────────────────┐
│ Determine whether a sum of luminance absolute   │
│ differences of a few pairs of intra pixels next │
│ to each block edge in one of the two adjacent   │
│ macroblocks of the block edge is smaller than a │
│ second preset value, and if the sum of luminance│
│ differences of the pairs of inter pixels in one │
│ of the two adjacent macroblocks is not smaller  │──212'
│ than the second preset value, set the ratio of  │
│ the sum of luminance absolute differences of    │
│ the pairs of inter pixels in the two adjacent   │
│ macroblocks and the sum of luminance absolute   │
│ differences of the pairs of intra pixels in the │
│ macroblock not smaller than the second preset   │
│ value                                           │
└─────────────────────────────────────────────────┘
                        │
                        ▼
┌─────────────────────────────────────────────────┐
│ Calculate a ratio of a sum of luminance         │
│ absolute differences of the pairs of inter      │
│ pixels next to each block edge in the two       │
│ adjacent macroblocks of the block edge and a    │
│ sum of luminance absolute differences of the    │
│ pairs of intra pixels next to each block edge   │
│ in one of the two adjacent macroblocks, and a   │──213'
│ ratio of the sum of luminance absolute          │
│ differences of the pairs of inter pixels next   │
│ to each block edge in two adjacent macroblocks  │
│ of the block edge and a sum of luminance        │
│ absolute differences of the pairs of intra      │
│ pixels next to the block edge in the other      │
│ adjacent macroblock                             │
└─────────────────────────────────────────────────┘
                        │
                        ▼
┌─────────────────────────────────────────────────┐
│ Determine the blocking degree of the            │──214'
│ corresponding block edge according to a sum     │
│ of the two ratios                               │
└─────────────────────────────────────────────────┘
```

FIG. 5

METHOD OF ESTIMATING A QUANTIZATION PARAMETER

This application claims the benefit of Taiwan application Serial No. 95123027, filed Jun. 26, 2006, the subject matter of which is incorporated herein by reference.

BACKGROUND OF THE INVENTION

1. Field of the Invention

The invention relates in general to a method of estimating a quantization parameter (QP), and more particularly to a method of estimating a quantization parameter for a de-blocking filter according to blocking degrees (BD) of a block-based frame.

2. Description of the Related Art

In technology of block-based image compression, such as JPEG or MPEG, the original images to be compressed are divided into a number of macroblocks (MB) with suitable size first and each macroblock is then treated as a unit to be processed by coding and decoding. The quantization operation in coding belongs to a step of loss compression. The higher is a compression rate, the larger is the influence of a quantization error on the decoding terminal. For example, the edges of the macroblocks, after decoded, may have color discontinuity and grid noise, which are called blocking artifacts generally.

In terms of the decoded block-based images, a de-blocking filter, which is a low-pass filter, is normally used to smooth the edge noise of the blocking artifacts. In a de-blocking process, a quantization parameter (QP) used in the coding procedure has to be referred in order to determine whether a high-frequency part of the decoded block-based images is generated in the quantization step and accordingly determine the filtering intensity to achieve a better de-blocking effect. The QP value affects directly the compression rate and when a higher QP value is used, the blocking artifacts generated will become more apparent.

However, when the decoded block-based images are de-blocked, the QP value is not recorded, and the present de-blocking filter just uses a preset value as a reference for the QP value. As a result, the filtering intensity cannot be suitably determined to obtain a better de-blocking effect.

SUMMARY OF THE INVENTION

The invention is directed to a method of estimating a quantization parameter. The relationship of the quantization parameter and the blocking artifacts is used. The blocking degrees representing the blocking artifacts are obtained from the decoded block-based images and the quantization parameter is estimated according to the blocking degrees. Therefore, the quantization parameters of various block-based images can be properly obtained for the de-blocking filter in the next stage.

According to the present invention, a method of estimating a quantization parameter is provided. The method is applied to a de-blocking filter. The de-blocking filter de-blocks a decoded block-based image according to the quantization parameter, and the block-based image is coded and decoded in units of macroblocks. The method comprises calculating blocking degrees of a number of block edges corresponding to the macroblocks; and estimating the quantization parameter according to a sum of the blocking degrees.

The invention will become apparent from the following detailed description of the preferred but non-limiting embodiments. The following description is made with reference to the accompanying drawings.

BRIEF DESCRIPTION OF THE DRAWINGS

FIG. 5 is a sub-flowchart of the step 210 in FIG. 2 according to a second embodiment of the invention.

DETAILED DESCRIPTION OF THE INVENTION

Figure 1:
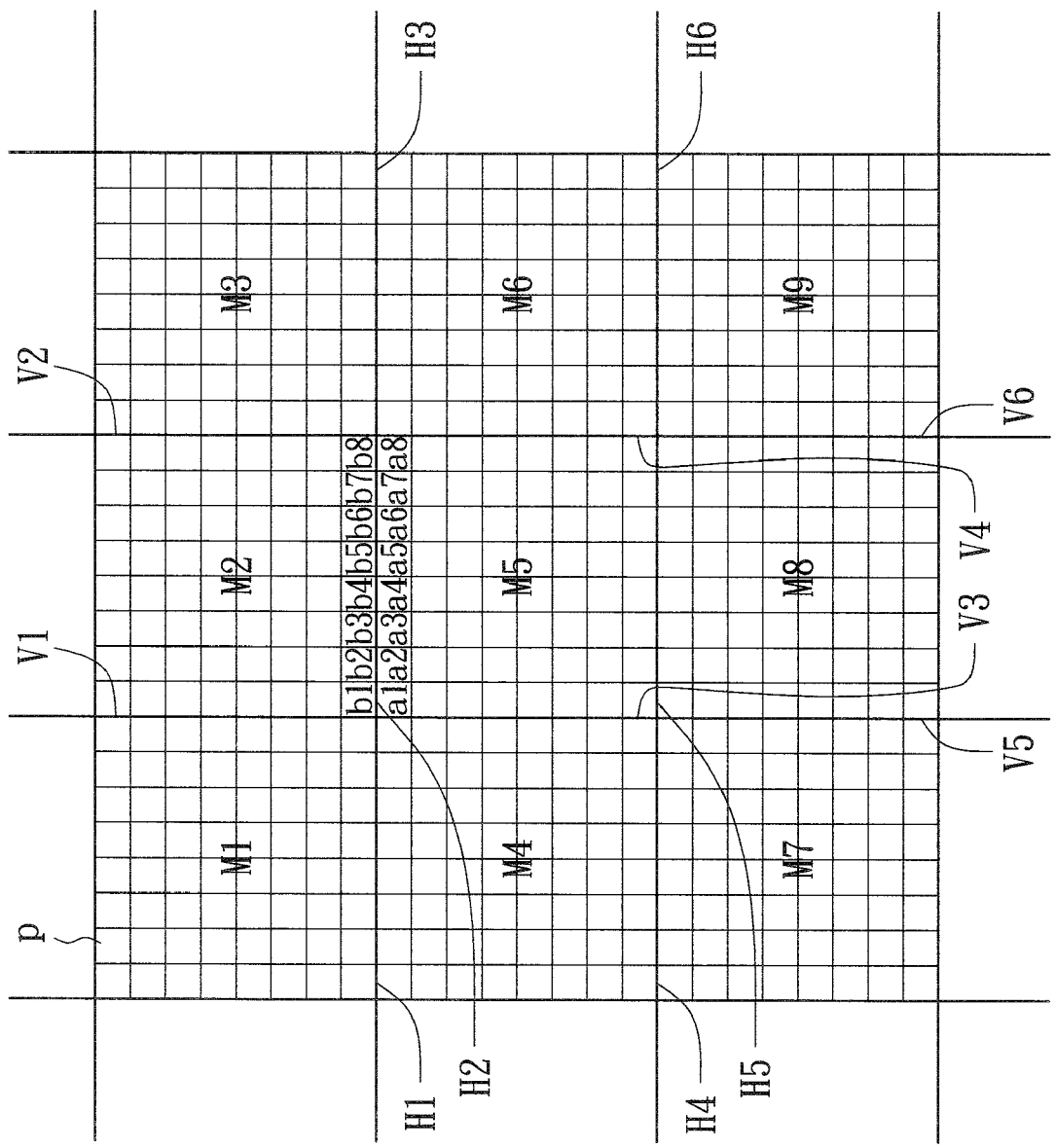
FIG. 1 is a partial schematic diagram of a block-based image according to the invention.

Referring to FIG. 1, a partial schematic diagram of a block-based image according to the invention is shown. In FIG. 1, a block-based image M is coded and decoded in units of macroblocks, such as M1~M9. Each macroblock includes 64 (8×8) pixels p and the macroblocks M1~M9 have horizontal block edges H1~H6 and vertical block edges V1~V6. The size of each macroblock and the amount of the macroblocks are determined according to the used coding compression technique and the original image data.

Figure 2:
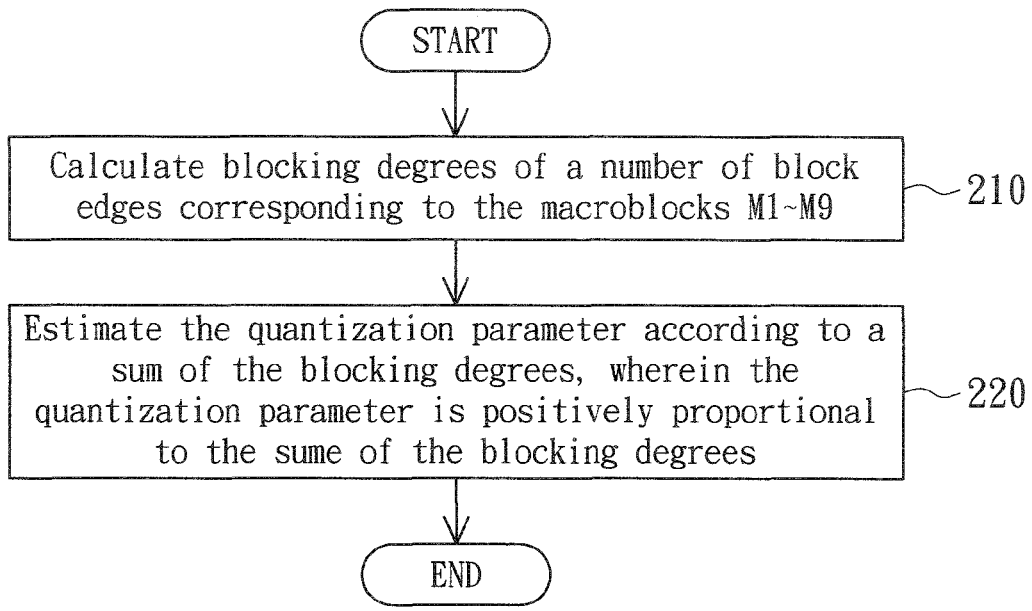
FIG. 2 is a flow chart of a method of estimating a quantization parameter according to the invention.

Referring to FIG. 2, a flow chart of a method of estimating a quantization parameter according to the invention is shown. First, in step 210, calculate blocking degrees (BD) of a number of block edges corresponding to the macroblocks M~M9. As mentioned above, the decoded block-based image M will have blocking artifacts of discontinuity, especially in pixel luminance, on the block edges H~H6 and V~V6 of the macroblocks M~M9. Therefore, the degree of blocking artifacts can be estimated according to the blocking degrees of the block edges H1~H6 and V~V6 obtained by calculating luminance variation between the pixels in a numeric way.

Finally, in step 220, estimate the quantization parameter according to a sum of the blocking degrees. That is, after the blocking degrees of the block edges H1~H6 and V1~V6 are obtained, the sum of the blocking degrees is used as a numeric performance of the whole blocking artifacts of the block-based image M and the quantization parameter can be estimated to be positively proportional to the sum of the blocking degrees.

As for the relevant definite calculation of each step, two embodiments are taken for illustration, but the skill scope of the invention is not limited thereto.

Embodiment One

Figure 3:
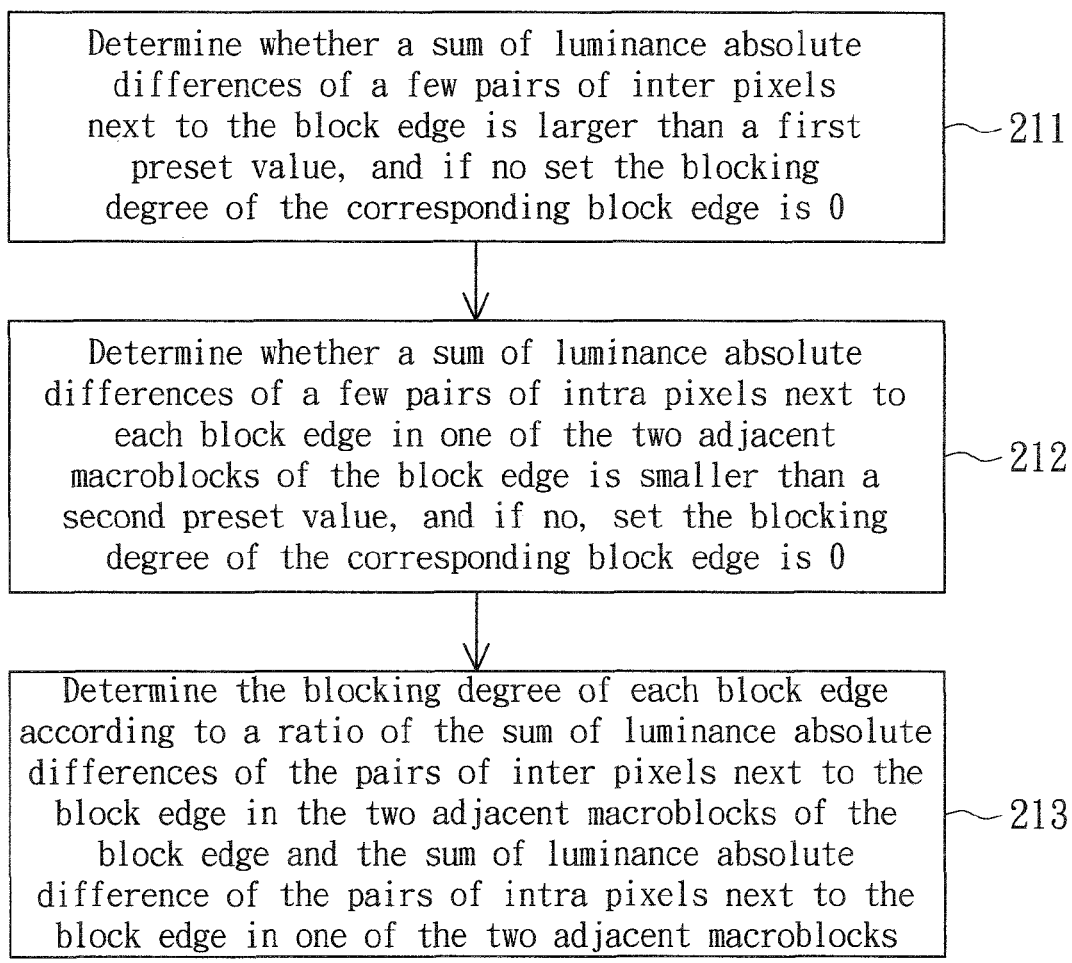
FIG. 3 is a sub-flowchart of the step 210 in FIG. 2 according to a first embodiment of the invention.
Figure 4A:
FIGS. 4A~4D are schematic diagrams of four block-based images according to the invention.
Figure 4B:
Figure 4C:
Figure 4D:
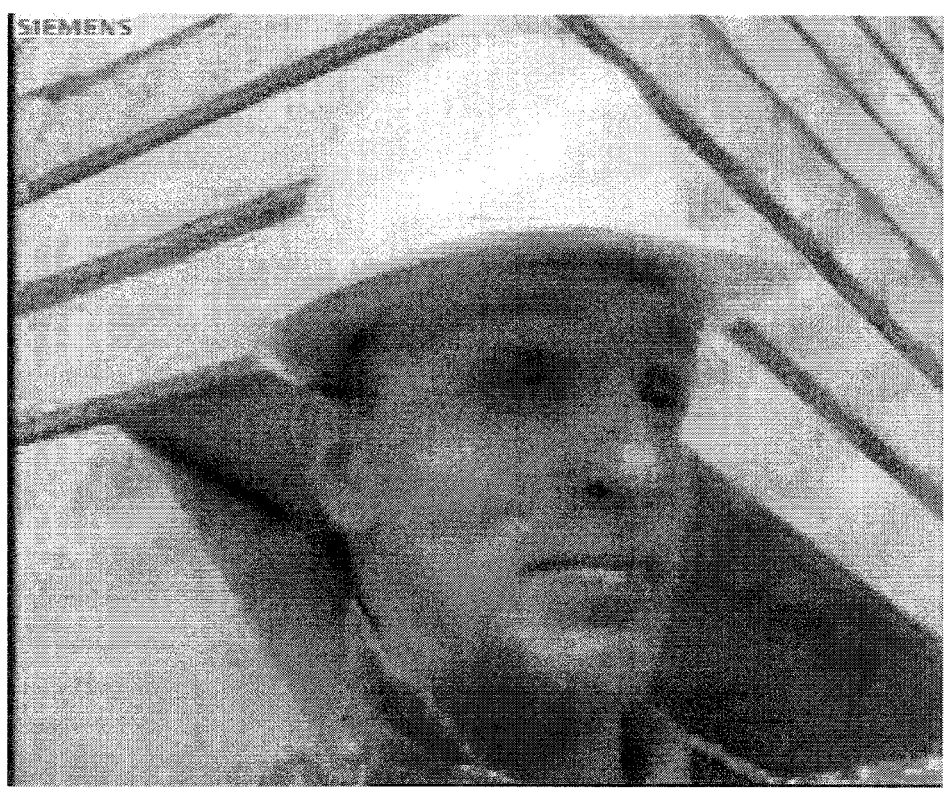

Referring to FIG. 3, a sub-flowchart of the step 210 in FIG. 2 according to a first embodiment of the invention is shown. The embodiment calculates the blocking degree of each block edge according to luminance of pixels next to the block edge in the two adjacent macroblocks of the block edge.

As shown in FIG. 3, in step 211, determine whether a sum of luminance absolute differences of a few pairs of inter pixels next to the block edge is larger than a first preset value, and if no, set the blocking degree of the corresponding block edge is 0.

The block edge H2 is taken as an example. The two adjacent macroblocks M2 and M5 have 8 pairs of inter pixels, that is, the pixels a1 and b1, a2 and b2, a3 and b3, a4 and b4, a5 and b5, a6 and b6, a7 and b7, and pixels a8 and b8. For illustration convenience, a_i and b_i are used to respectively represent luminance of the pixels ai and bi, wherein i=1~8, and Q2 denotes a sum of luminance absolute differences of the pairs of inter pixels of the block edge H2. That is, the step 211 determines whether $$\sum_{i=1\sim 8} |a\_i - b\_i| = Q2$$

is large enough and uses a first preset value as a reference for determination.

For example, the first preset value is about 48~64 and can be set according to the used image compression technique and the relevant coding format. When the value Q2 is not larger than the first preset value, the luminance variation of the block edge H2 cannot be distinguished by human eyes, and thus the blocking degree of the block edge H2 is set to be 0.

Next, in step 212, determine whether a sum of luminance absolute differences of a few pairs of intra pixels next to each block edge in one of the two adjacent macroblocks of the block edge is smaller than a second preset value, and if no, set the blocking degree of the corresponding block edge is 0.

Similarly, the block edge H2 and macroblock M5 are taken as an example. The macroblock M5 has 7 pairs of intra pixels next to the block edge H2, that is, the pixels a1 and a2, a2 and a3, a3 and a4, a4 and a5, a5 and a6, a6 and a7, and pixels a7 and a8. For illustration convenience, P2 is used to represent a sum of luminance absolute differences of the pairs of intra pixels of the macroblock M5. That is, the step 212 determines whether $$\sum_{i=1\sim 7} |a\_i - a\_(i+1)| = P2$$

is small enough and uses a second preset value as a reference for determination. For example, the second preset value is about 12~20 and can be similarly set according to the used image compression technique and relevant coding format. Of course, a sum of luminance absolute differences of the 7 pairs of intra pixels of the macroblocks M2 can also be calculated instead for determining the corresponding blocking degree.

Afterward, in step 213, determine the blocking degree of each block edge according to a ratio of the sum of luminance absolute differences of the pairs of inter pixels next to the block edge in the two adjacent macroblocks of the block edge and the sum of luminance absolute difference of the pairs of intra pixels next to the block edge in one of the two adjacent macroblocks. For example, when the values Q2 and P2 of the block edge H2 are respectively larger than the first preset value and smaller than the second preset value, the blocking degree corresponding to the block edge H2 can be determined by Q2/P2. The embodiment sets the blocking degree to be a multiplication of Q2/P2 and a third preset value. The third preset value is substantially about 0.2~0.4. That is, when the blocking degree of the block edge H2 is denoted by HBD_2 and the third preset value is denoted by t3, HBD_2=t3×(Q2/P2). The blocking degrees of other block edges can also be obtained according to the same principle.

If B represents a sum of the blocking degrees of the block edges H1~H6 and V~V6, and QP denotes the quantization parameter, QP can be set to be t4×log(B), wherein t4 is a fourth preset value, such as about 3~5.

Referring to FIGS. 4A~4D, schematic diagrams of four block-based images according to the invention are shown. The compression rate (or blocking artifacts) is successively decreasing from FIG. 4A to FIG. 4D. According to the above method of estimating a quantization parameter, the QP values of FIGS. 4A~4D are respectively 39, 33, 30 and 26. Therefore, the de-blocking filter can perform de-blocking processing according to the QP value of each block-based image.

Embodiment Two

Referring to FIG. 5, a sub-flowchart of the step 210 in FIG. 2 according to a second embodiment of the invention is shown. The difference of the second embodiment and the first embodiment lies in the step 212' of the second embodiment processes the two adjacent macroblocks of each block edge. For example, in terms of the block edge H2, the method compares a sum $$\sum_{i=1\sim 7} |b\_i - b\_(i+1)| = P2'$$

of luminance absolute differences of 7 pairs of intra pixels next to the block edge H2 in the macroblock M2 with the second preset value. When the values Q2, P2 and P2' satisfy the required amount range, the two ratios Q2/P2 and Q2/P2' are calculated in the step 213'.

The second embodiment sets the blocking degree to be a multiplication of the sum [(Q2/P2)+(Q2/P2')] of the two ratios and the third preset value. That is, the blocking degree HBD_2 of the block edge H2 is equal to t3×[(Q2/P2)+(Q2/P2')]. The blocking degrees of other block edges can be also obtained according to the same principle for calculating the quantization parameter.

Any one who is skilled in the technique of the invention can realize the scope of the invention is not limited to the above two embodiments. First, the number of macroblocks or block edges to be processed can be adjusted according to hardware ability and requirement, a size of original image data, and a compression rate. For example, by combining a line buffer for accessing data, only the blocking degrees of the horizontal block edges have to be calculated and thus the processing speed can be improved. Or the ratio of the sum of luminance absolute differences of inter pixels and the sum of luminance absolute differences of intra pixels of each block edge can be obtained by processing only one adjacent macroblock of the block edge as in the first embodiment or by processing the two adjacent macroblocks of the block edge as in the second embodiment.

Besides, the sum of luminance absolute differences of inter pixels and the sum of luminance absolute differences of intra pixels can also be respectively calculated in a different way. Take the obtained values Q2, P2 and P2' of the above block edge H2 as an example. The absolute value of the value (Q2−P2) or (Q2−P2') can be either used as a reference for calculating the blocking degree. Except of the sum of the two ratios Q2/P2 and Q2/P2', other kinds of numerical calculation about the two ratios Q2/P2 and Q2·P2' can also be used for estimating the corresponding blocking degree. The first to the fourth preset values can be adjusted according to the above various situations to properly estimate the quantization parameter for the next-stage de-blocking processing. As long as the blocking degrees can be obtained from the decoded block-based images and the quantization parameter can be estimated accordingly for the de-blocking filter to perform the de-blocking processing on the block-based images, all the alternatives are not apart from the scope of the invention.

The method of estimating a quantization parameter disclosed by the above embodiment of the invention uses the relationship between the quantization parameter and the blocking artifacts. The blocking degrees representing the blocking artifacts are obtained from the decoded block-based images and the quantization parameter is estimated according to the blocking degrees. Therefore, by simple calculation, the proper quantization parameter corresponding to any different block-based image can be estimated for the next-stage de-blocking filter.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of estimating a quantization parameter (QP), applied to a de-blocking filter, the de-blocking filter de-blocking a decoded block-based image according to the quantization parameter, the block-based image being coded and decoded in units of macroblocks, the method comprising:

(a) calculating blocking degrees of a plurality of block edges corresponding to the macroblocks; calculating a sum of luminance absolute differences of a plurality of pairs of inter pixels next to the block edge in two adjacent macroblocks of the block edge and a sum of luminance absolute differences of a plurality of pairs of intra pixels next to the block edge in one of the two adjacent macroblocks; and determining the blocking degree of each block edge according to a ratio of the sum of luminance absolute differences of the pairs of inter pixels next to the block edge in the two adjacent macroblocks of the block edge and the sum of luminance absolute difference of the pairs of intra pixels next to the block edge in one of the two adjacent macroblocks; and (b) estimating the quantization parameter according to a sum of the blocking degrees.

2. The method according to claim 1, wherein the step (a) further comprises:

determining whether the sum of luminance absolute differences of the pairs of inter pixels next to the block edge is larger than a first preset value, and if no, setting the blocking degree of the block edge is 0.

3. The method according to claim 2, wherein the first preset value is about 48~64.

4. The method according to claim 1, wherein the step (a) further comprises:

determining whether the sum of luminance absolute differences of the pairs of intra pixels next to the block edge is smaller than a second preset value, and if no, setting the blocking degree of the block edge is 0.

5. The method according to claim 4, wherein the second preset value is about 12~20.

6. The method according to claim 1, wherein the blocking degree is a multiplication of the ratio and a third preset value.

7. The method according to claim 6, wherein the third preset value is about 0.2~0.4.

8. The method according to claim 1, wherein in the step (b), the quantization parameter is set to be t4×log(B), B is a sum of the blocking degrees and t4 is a fourth preset value.

9. The method according to claim 8, wherein the fourth preset value is about 3~5.

10. A method of estimating a quantization parameter (QP), applied to a de-blocking filter, the de-blocking filter de-blocking a decoded block-based image according to the quantization parameter, the block-based image being coded and decoded in units of macroblocks, the method comprising:

(a) calculating blocking degrees of a plurality of block edges corresponding to the macroblocks; calculating a ratio of a sum of luminance absolute differences of a plurality of pairs of inter pixels next to the block edge in two adjacent macroblocks of the block edge and a sum of luminance absolute differences of a plurality of pairs of intra pixels next to the block edge in one of the two adjacent macroblocks, and a ratio of the sum of luminance absolute differences of the pairs of inter pixels next to the block edge in two adjacent macroblocks of the block edge and a sum of luminance absolute differences of a plurality of pairs of intra pixels next to the block edge in the other adjacent macroblock; and (b) estimating the quantization parameter according to a sum of the blocking degrees.

11. The method according to claim 10, wherein the step (a) comprises:

determining the blocking degree of the block edge according to a sum of the two ratios.

12. The method according to claim 10, wherein the step (a) comprises:

determining whether the sum of luminance absolute differences of the pairs of inter pixels next to the block edge is larger than a first preset value, and if no, setting the blocking degree of the block edge is 0.

13. The method according to claim 12, wherein the first preset value is about 48~64.

14. The method according to claim 10, wherein the step (a) further comprises:

determining whether the sum of luminance absolute differences of the pairs of intra pixels next to the block edge in each of the two adjacent macroblocks is smaller than a second preset value, and if the sum of luminance absolute differences of the pairs of intra pixels next to the block edge in one of the two adjacent macroblocks is not smaller than the second preset value, setting the ratio related to the corresponding macroblock is 0.

15. The method according to claim 14, wherein the second preset value is about 12~20.

16. The method according to claim 11, wherein the blocking degree is a multiplication of the sum of the two ratios and a third preset value.

17. The method according to claim 16, wherein the third preset value is about 0.2~0.4.

18. The method according to claim 1, wherein in the step (a), the block edges are horizontal block edges.

19. The method according to claim 1, wherein the step (a) comprises:

calculating the blocking degree corresponding to each block edge according to luminance of a plurality of pixels next to the block edge in two adjacent macroblocks of the block edge.

20. The method according to claim 10, wherein the step (a) comprises:

calculating the blocking degree corresponding to each block edge according to luminance of a plurality of pixels next to the block edge in two adjacent macroblocks of the block edge.

21. The method according to claim 10, wherein in the step (a), the block edges are horizontal block edges.

* * * * *